United States Patent
Henschel et al.

(10) Patent No.: US 12,278,883 B2
(45) Date of Patent: Apr. 15, 2025

(54) DEVICE AND METHOD FOR CONNECTING A SERVICE-ORIENTED DEVICE TO A SIGNAL-BASED DEVICE

(71) Applicant: HELLA GmbH & Co. KGaA, Lippstadt (DE)

(72) Inventors: Felix Henschel, Unna (DE); Niklas May-Johann, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/889,144

(22) Filed: Aug. 16, 2022

(65) Prior Publication Data
US 2022/0394112 A1 Dec. 8, 2022

Related U.S. Application Data

(63) Continuation of application No. PCT/EP2021/053275, filed on Feb. 11, 2021.

(30) Foreign Application Priority Data

Feb. 19, 2020 (DE) ...................... 10 2020 104 405.4

(51) Int. Cl.
*H04L 69/08* (2022.01)
*H04L 67/12* (2022.01)
(Continued)

(52) U.S. Cl.
CPC ............... *H04L 69/08* (2013.01); *H04L 67/12* (2013.01); *H04L 67/51* (2022.05); *H04L 69/18* (2013.01)

(58) Field of Classification Search
CPC ......... H04L 12/66; H04L 67/01; H04L 69/08; H04L 69/12; H04L 69/18; H04L 67/12;
(Continued)

(56) References Cited

U.S. PATENT DOCUMENTS 8,705,527 B1* 4/2014 Addepalli ............... H04L 1/008
370/389
9,100,361 B1* 8/2015 Lucchesi ................. H04L 63/00
(Continued)

FOREIGN PATENT DOCUMENTS

DE 102019100436 A1 7/2019
EP 3817413 A1 * 5/2021 ............. H04L 67/10
WO WO2018127790 A2 7/2018

OTHER PUBLICATIONS

International Search Report dated Apr. 22, 2021 in corresponding application PCT/EP2021/053275.

*Primary Examiner* — Schquita D Goodwin
*Assistant Examiner* — Linh T. Nguyen
(74) *Attorney, Agent, or Firm* — Muncy, Geissler, Olds & Lowe, P.C

(57) ABSTRACT

A device for service-oriented communication with a signal-based hardware architecture. The device comprises a number of service-oriented communication interfaces for communicative connection to a number of external service-oriented communication partners, a number of signal-based communication interfaces for communication with a number of external signal-based devices, and an embedded system. The embedded system is configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces, into signal-based communication signals according to a signal-based communication protocol.

23 Claims, 5 Drawing Sheets

(51) Int. Cl.
  *H04L 67/51* (2022.01)
  *H04L 69/18* (2022.01)
(58) Field of Classification Search
  CPC ............... H04L 51/066; H04L 65/1043; H04L 12/2836; H04L 47/2475; H04L 67/141; H04L 69/14
  See application file for complete search history.

(56) References Cited

U.S. PATENT DOCUMENTS

| | | |
|---|---|---|
| 9,654,937 B2 | 5/2017 | Addepalli et al. |
| 10,055,260 B2 | 8/2018 | Teshler et al. |
| 10,191,777 B2 | 1/2019 | Teshler et al. |
| 10,750,339 B2 | 8/2020 | Pradhubeva et al. |
| 2004/0019693 A1* | 1/2004 | Grow ...................... H04L 67/75 709/232 |
| 2005/0068962 A1* | 3/2005 | Hillenbrand ........ H04L 65/1043 370/395.2 |
| 2006/0167818 A1* | 7/2006 | Wentker ................ H04L 9/3263 705/64 |
| 2006/0271694 A1* | 11/2006 | Matsuo ............... H04L 12/4625 709/229 |
| 2009/0049202 A1* | 2/2009 | Pattison ................ H04M 15/57 709/249 |
| 2009/0268668 A1* | 10/2009 | Tinnakornsrisuphap .................... H04L 61/103 370/328 |
| 2010/0229107 A1* | 9/2010 | Turner ..................... A63F 13/30 715/757 |
| 2012/0316726 A1* | 12/2012 | Schroeck .............. G06F 16/211 701/32.7 |
| 2013/0159466 A1* | 6/2013 | Mao ........................ H04L 69/08 709/218 |
| 2013/0282227 A1* | 10/2013 | Chen ..................... G07C 5/008 701/1 |
| 2014/0074994 A1* | 3/2014 | Honda ................... H04L 69/18 709/219 |
| 2014/0277922 A1* | 9/2014 | Chinnadurai ........ G07C 5/0808 701/33.2 |
| 2016/0253849 A1* | 9/2016 | Kwak .................... G07C 5/008 701/31.5 |
| 2017/0063971 A1 | 3/2017 | Poehnl et al. |
| 2017/0142031 A1* | 5/2017 | Mackie ................... H04L 49/30 |
| 2018/0089995 A1* | 3/2018 | Zhang ................... G08G 1/0145 |
| 2018/0189103 A1 | 6/2018 | Teshler et al. |
| 2018/0222442 A1* | 8/2018 | Sellschopp ........... G06F 21/629 |
| 2019/0126858 A1 | 5/2019 | Parmar et al. |
| 2019/0206246 A1* | 7/2019 | Schön .................... B60S 1/0818 |
| 2020/0351123 A1* | 11/2020 | Haga ...................... H04L 12/66 |
| 2021/0160315 A1* | 5/2021 | Linn-Moran .......... G07C 5/008 |
| 2021/0243047 A1* | 8/2021 | Arndt ..................... H04L 47/28 |

* cited by examiner

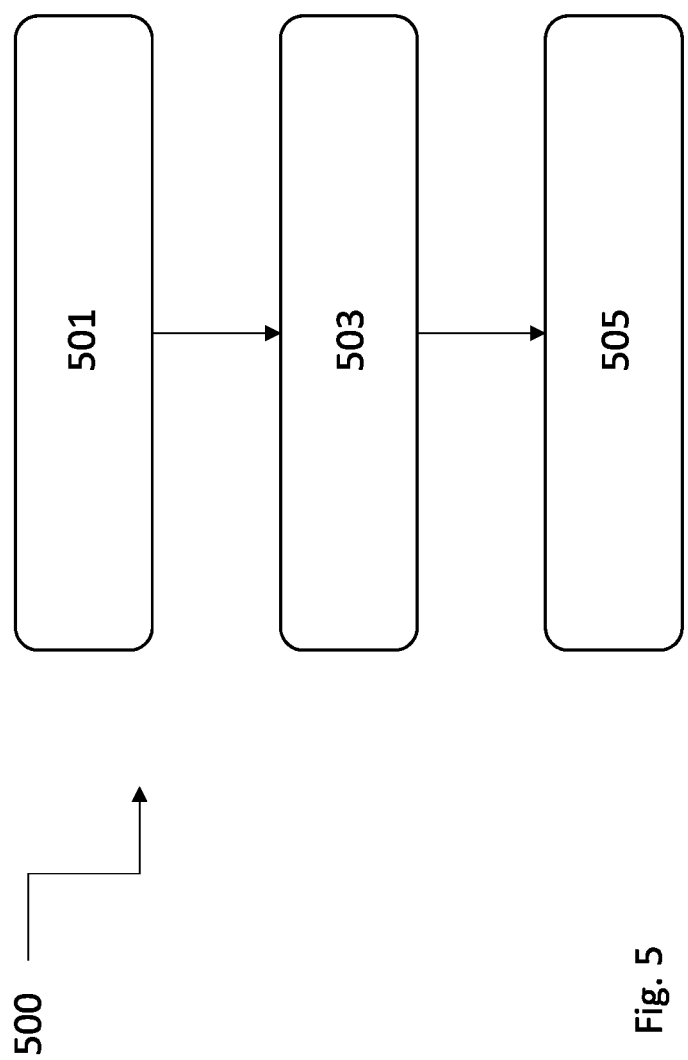

DEVICE AND METHOD FOR CONNECTING A SERVICE-ORIENTED DEVICE TO A SIGNAL-BASED DEVICE

This nonprovisional application is a continuation of International Application No. PCT/EP2021/053275, which was filed on Feb. 11, 2021, and which claims priority to German Patent Application No. 10 2020 104 405.4, which was filed in Germany on Feb. 19, 2020, and which are both herein incorporated by reference.

BACKGROUND OF THE INVENTION

Field of the Invention

The present invention relates to a device and method for connecting a service-oriented device to a signal based device.

Description of the Background Art

For communication between devices in a vehicle, a so-called "service-oriented architecture" is increasingly being used in which various communication data are managed, therefore, requested and provided, as so-called "services." Such services offer the advantage that they can be activated or deactivated as needed and dynamically assigned to different devices.

To enable a service-oriented communication in a vehicle, it is currently necessary to equip respective devices of the vehicle that are to participate in the service-oriented communication with a specific control unit that supports service-oriented communication interfaces and protocols. Such control units are expensive and must be adapted to a specific vehicle architecture in a costly manner.

WO 2018/127790 A2, which corresponds to US 2018/0189103 describes a service-oriented server configured to provide a service to an external device in a vehicle.

SUMMARY OF THE INVENTION

It is therefore an object of the present invention to provide a cost-effective and robust way to implement a service-oriented communication in a signal-based vehicle architecture.

In an example, the invention relates to a device for service-oriented communication with a signal-based hardware architecture. The device comprises a number of service-oriented communication interfaces for communicative connection to a number of external service-oriented communication partners, a number of signal-based communication interfaces for communication with a number of external signal-based devices, and an embedded system. The embedded system is configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces, into signal-based communication signals according to a signal-based communication protocol.

In the context of the present invention, service-oriented communication is understood to mean communication in which packet data combined into services are exchanged by means of a service-oriented protocol and assigned to respective service-oriented communication partners. The services can be assigned dynamically and as required to different communication partners by adjusting communication parameters such as, for example, a destination address or bandwidth.

A signal-based hardware architecture can be understood to mean a number of devices that exchange communication signals by means of fixed predefined communication parameters.

A routing logic can be understood to mean an assignment of respective signal-based communication interfaces to respective signal-based communication interfaces. A predefined routing logic can be adapted as required, in particular dynamically, so that, for example, a signal-based communication partner can be dynamically assigned to different signal-based communication partners.

A transformation of signal-based communication signals according to a service-oriented communication protocol into service-oriented communication signals can be to be understood to mean a process in which signal-based communication signals are adapted, i.e., reorganized, for example, in such a way that they can be processed with a respective communication protocol. For the transformation of signal-based communication signals, for example, transformation protocols can be used that comprise instructions on how to insert which communication data where in order to complete the transformation.

An embedded system can be understood to mean a component comprising both manufacturer-configurable ICs, such as an ASIC, and user-configurable ICs, in particular a processor. An embedded system can, for example, contain a so-called "gateway" that supports forwarding functions or so-called "routing" between the respective communication interfaces of the presented device. In addition to the forwarding functions, the embedded system of the presented device supports a transformation of data or data packets from a signal-based communication protocol to a service-oriented communication protocol and a transformation of data or data packets from a service-oriented communication protocol to a signal-based communication protocol. This transformation can take place in a purely software-based manner, therefore, by programs executed in the embedded system, or in a hardware-based manner, therefore, by physical circuits or circuitry without the use of software. Of course, a partly software-based and partly hardware-based transformation can also take place. An embedded system can be a computing unit.

The device presented serves in particular to make an existing and tested signal-based communication architecture of a vehicle accessible to a service-oriented communication or control. To this end, it is provided that the device is connected to respective signal-based external devices, therefore, respective devices of the vehicle's communication architecture, via signal-based communication interfaces. This means that the external signal-based devices are in communicative connection with the signal-based communication interfaces and exchange data. The signal-based communication interfaces can be configured, for example, for communication via a signal-based CAN, LIN, or PSI5 protocol.

Furthermore, it is provided that the presented device is connected to respective external service-oriented communication partners, therefore, for example, respective devices of a service-oriented communication architecture of the vehicle or an external control instance, via service-oriented communication interfaces. This means that the external service-oriented communication partners are in communicative connection with the service-oriented communication interfaces and exchange data. The service-oriented communication interfaces can be configured, for example, for communication via a SOME/IP protocol, a SOME/IP-SD protocol, or similar protocols from the so-called "AUTOSAR" context.

The presented device comprises an embedded system, in particular a gateway, by means of which transformation processes for transforming signal-based data, therefore, data structured according to a signal-based communication protocol, are transformed into service-oriented data, therefore, data structured according to a service-oriented communication protocol, and vice versa.

Further, the embedded system is used for routing, i.e., for establishing or disconnecting communication connections between respective communication interfaces of the presented device.

The presented device can be preconfigured with a pre-define routing logic in order to prepare an existing signal-based component, in particular a hardware architecture, for service-oriented communication, i.e., to make it "SOA-ready", without additional adaptations. Alternatively, or in addition, the device can be prepared for special hardware architectures by means of additional configuration instructions, such as, for example, a corresponding modifiable routing logic.

It can be provided that the embedded system is configured to provide an offering catalog comprising a list of services that can be provided by the device, and the embedded system is further configured to dynamically update the offering catalog depending on respective external signal-based devices, communicating with the device, using a predefined offering mapping logic.

By means of an offering catalog comprising respective services that can be provided by the device, the device can serve service-oriented communication subscribers, i.e., provide respective service-oriented communication subscribers that have subscribed to a service with the device with corresponding data of respective signal-based devices. Based on the offering catalog, respective service-oriented communication subscribers can determine which services are offered by the device.

An offering mapping logic specifies which data can be offered as which services by which signal-based devices. For example, the offering mapping logic can specify that data from a signal-based rain/light sensor can be used to provide a "rain information" service and a "light information" service. In this example, the presented device can be configured to retrieve data from the rain/light sensor only when a "rain information" service or a "light information" service has been subscribed to by a service-oriented communication partner. Accordingly, cyclic data provision by the rain/light sensor can be dispensed with, regardless of the respective requirements. By dispensing with cyclical data provision, communication resources are conserved and energy is saved.

By dynamically updating the offering catalog, a list of available services can be adapted depending on, for example, a configuration and/or a state of a component currently connected to the presented device, so that the device is suitable for use on different components or configurations. This means that the presented device can be universally and flexibly used and adapted for the various components.

It can be further provided that the embedded system is configured to provide a request catalog comprising a list of services required for a predefined function, and to dynamically update the request catalog depending on the particular function of the predefined function using a predefined request mapping logic, and to forward respective data from the respective provided services to corresponding external signal-based devices in accordance with the request mapping logic.

In order to control respective signal-based devices connected to the presented device in a service-dependent manner, a request catalog can be used that comprises respective services to be supplied with data. Using a request mapping logic, the data and devices required for the services to be supplied currently can be determined and controlled accordingly.

It can be provided furthermore that the embedded system is configured to route respective signal-based communication signals, predefined by a direct connection catalog, from the number of signal-based communication interfaces directly to respective service-oriented communication interfaces, predefined according to the predefined routing logic.

By direct forwarding, i.e., a so-called "direct routing" of selected or predefined signal-based communication signals to respective service-oriented communication interfaces, a direct access to corresponding signal-based devices can be guaranteed, i.e., access to data, generated by the signal-based devices, without a transformation of the data. Such direct forwarding is required, for example, for data acquisition using predefined communication protocols, such as, for example, diagnostic data in the UDS protocol.

It can be provided further that the device comprises a memory, and that the embedded system is configured to temporarily store cyclically provided signal-based communication signals in the memory, and to assign respective signal-based communication signals, temporarily stored in the memory, asynchronously in time to the service-oriented communication signals to be provided to the cyclically provided signal-based communication signals.

In order to enable a transformation of data, provided, for example, cyclically, and provided according to a signal-based communication protocol, into a service-oriented communication protocol that provides data demand-oriented, a memory can be provided that compensates for a temporary offset between respective requirements of the service-oriented communication protocol and a timing of the signal-based communication protocol. This means that respective data, provided according to a signal-based communication protocol, is temporarily stored in the memory, for example, until it is retrieved by a service-oriented communication protocol or updated according to the signal-based communication protocol.

It can be provided further that the device comprises a user interface for configuring the routing logic and/or the offering mapping logic and/or the request mapping logic.

Via a user interface, a user can be enabled to customize forwarding rules, therefore, the routing logic and/or the offering mapping logic and/or the request mapping logic of the presented device.

It can be provided further that the embedded system can be configured to transmit a switching signal to a respective external signal-based device depending on a service-oriented communication signal requested by an external service-oriented communication partner, so as to activate or deactivate the respective external signal-based device.

By selectively activating or deactivating respective devices, connected to the presented device, by the device, an on-demand activation of respective devices required, for example, according to services subscribed to by a communication partner can take place. Accordingly, activity of unneeded devices is avoided and energy consumption of a component is minimized. Furthermore, communication resources, especially of the presented device, are conserved.

"Activating" can be understood to mean supplying electricity to a device that was not previously supplied with electricity or changing an operational state by a corresponding control command, such as a "wake up," for example. Accordingly, "deactivating" can be understood to mean disconnecting from a supply of electricity a device that was previously supplied with electricity or changing an operational state by a corresponding control command, such as a "standby command," for example.

It can be provided furthermore that the device comprises a switching communication interface and that the embedded system is configured to transmit the switching signal to the respective external signal-based device via the switching communication interface.

For transmitting a switching signal for activating or deactivating respective devices, the presented device can comprise a switching communication interface, such as, for example, a so-called "EN-PIN," which is connected to a switching pin for activating or deactivating a respective device, or a wireless communication interface.

In a second aspect, the presented invention relates to a communication system for a vehicle. The communication system comprises a number of signal-based devices, a number of service-oriented communication partners, and a possible embodiment of the presented device, wherein the device is configured to communicatively connect the number of signal-based devices to the number of service-oriented communication partners.

In particular, the presented communication system can be used to operate the presented device in a vehicle.

The invention presented also relates to a method for controlling a communication in a communication system, wherein the method comprises a first connecting step for connecting a possible embodiment of the presented device to a number of signal-based devices, a second connecting step for connecting the device to a number of service-oriented communication partners, and a control step for controlling a communication of the number of service-oriented communication partners with the number of signal-based devices by means of the device.

In particular, the presented method is used to operate the presented device, for example, in the presented communication system.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a possible embodiment of the presented method.

DETAILED DESCRIPTION

Figure 1:
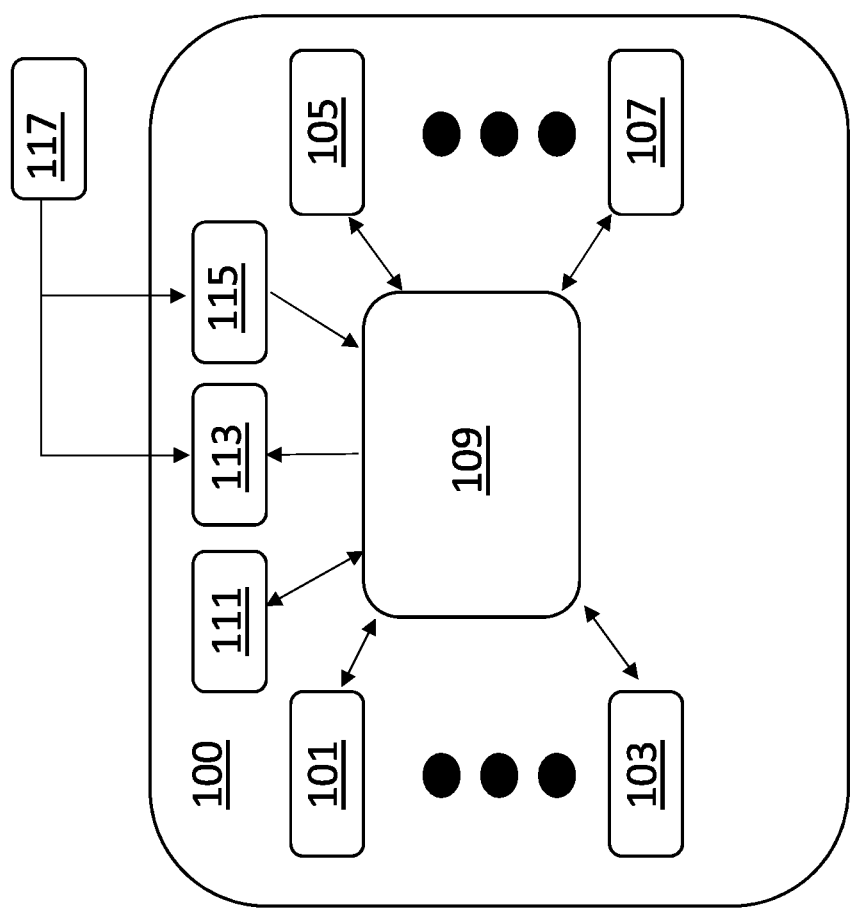
FIG. 1 shows a possible embodiment of the presented device.

A device 100 is shown in FIG. 1. Device 100 comprises a number of service-oriented communication interfaces 101 to 103, a number of signal-based communication interfaces 105 to 107, and an embedded system 109 in the form of a gateway. The embedded system 109 accesses an optional memory 111 to determine data stored therein, such as, for example, cyclically updated signal-based data, i.e., data provided cyclically by signal-based devices.

Furthermore, the embedded system 109 comprises a routing logic that specifies which signal-based communication interfaces 105 to 107 are to be communicatively connected to which signal-based communication interfaces. The routing logic can change dynamically depending on the particular supported services.

To enable a service-oriented communication partner to communicate with device 100, the device provides an offering catalog 113 comprising a list of services supported by the device. The list of services supported by the device can change, for example, depending on the respective signal-based devices connected to the signal-based communication interfaces 105 to 107 or their operational states.

Embedded system 109 is configured to transform signal-based communication signals, provided by the signal-based communication interfaces 105 to 107, into service-oriented communication signals according to a service-oriented communication protocol, and to transform service-oriented communication signals, provided by the respective service-oriented communication interfaces 101 to 103, into signal-based communication signals according to a signal-based communication protocol. Accordingly, device 100 acts as an intermediary between service-oriented communication partners and signal-based devices.

For direct, i.e., non-transformed forwarding of selected data, such as diagnostic data, for example, embedded system 109 accesses an optional direct connection catalog 115 that specifies which signal-based communication interfaces 105 to 107 are directly connected to which service-oriented communication interfaces 101 to 103.

The signal-based communication interfaces 105 to 107 can be, for example, CAN interfaces to a CAN network of a vehicle.

The service-oriented communication interfaces 101 to 103 can be, for example, Ethernet interfaces for connection to a service-oriented communication partner, such as, for example, a central control unit.

Of course, the signal-based communication interfaces 105 to 107 and/or the service-oriented communication interfaces 101 to 103 can be designed wired or wireless.

The direct connection catalog 115 and offering catalog 113 can be provided, customized or preconfigured, via an optional user interface, i.e., stored in memory 111, for example.

Figure 2:
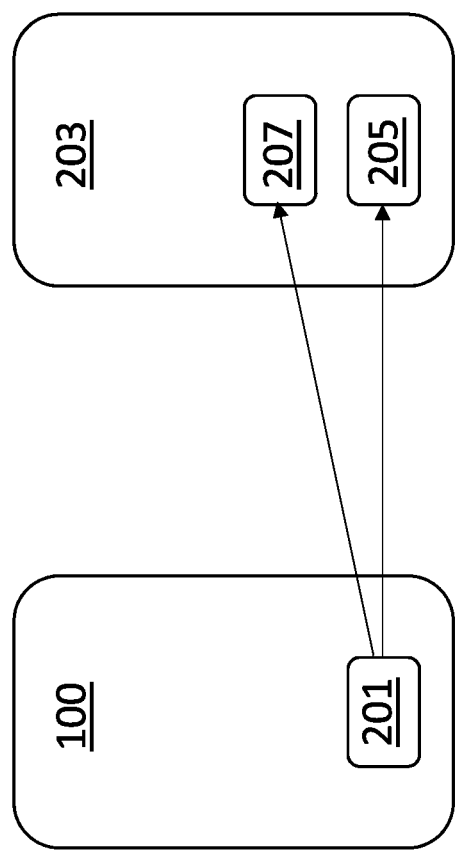
FIG. 2 shows a further possible embodiment of the presented device.

In FIG. 2, device 100 is shown with an additional switching communication interface 201 in the form of an "EN-PIN." An activation signal or a deactivation signal for activating or deactivating, respectively, a signal-based device 203, such as, for example, a sensor or an actuator, can be transmitted by means of switching communication interface 201.

The activation signal can be, for example, supplying electricity to device 203 or a control command, such as, for example, a "wake up" for controlling device 203.

The deactivation signal can be, for example, a disconnection of device 203 from an electricity supply or a change in an operational state of device 203 by a corresponding control command for controlling device 203, such as a "standby command," for example.

The switching communication interface 201 can be connected to a power supply switch 205 of device 203 to control its electricity supply. Alternatively or in addition, the switching communication interface 201 can be connected to a control switch 207 for controlling an operational state of device 203.

Figure 3:
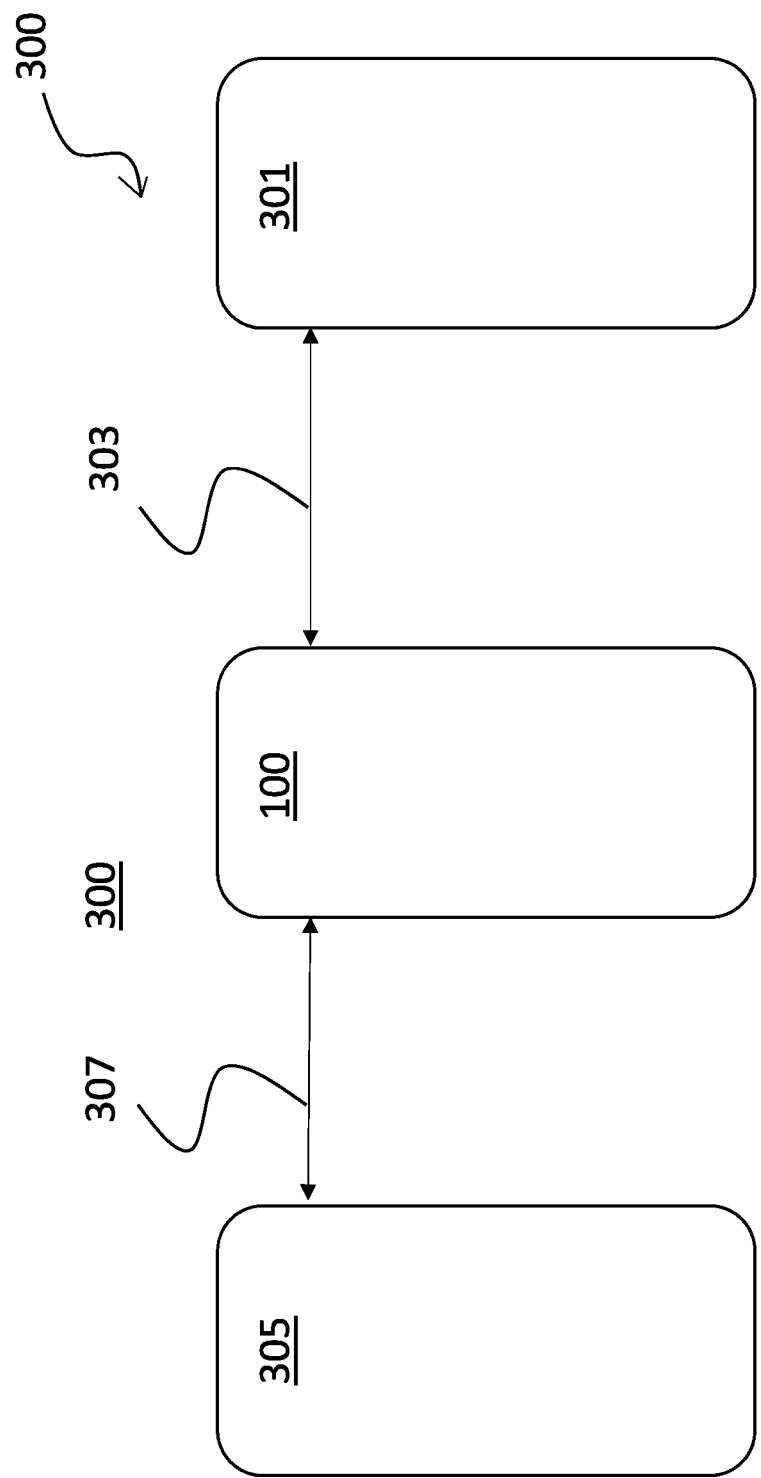
FIG. 3 shows a possible embodiment of the presented communication system.

A communication system 300 is shown in FIG. 3. Communication system 300 comprises a signal-based device 301, such as, for example, a sensor or an actuator, and device 100 according to FIG. 1.

Device 100 is connected to the signal-based device 301, as indicated by arrow 303. Furthermore, device 100 is connected to a service-oriented communication partner 305, as indicated by arrow 307. Accordingly, device 100 acts as an intermediary between signal-based device 301 and service-oriented communication partner 305. To this end, device 100 provides service-oriented communication partner 305 with an offering catalog of supported services. These services can optionally be updated at runtime via an interface, in particular a user interface.

Depending on respective services subscribed to by the service-oriented communication partner 305 in the case of device 100, device 100 determines a routing logic for forwarding and transforming data of signal-based device 301 to the service-oriented communication partner 305 and vice versa.

Figure 4:
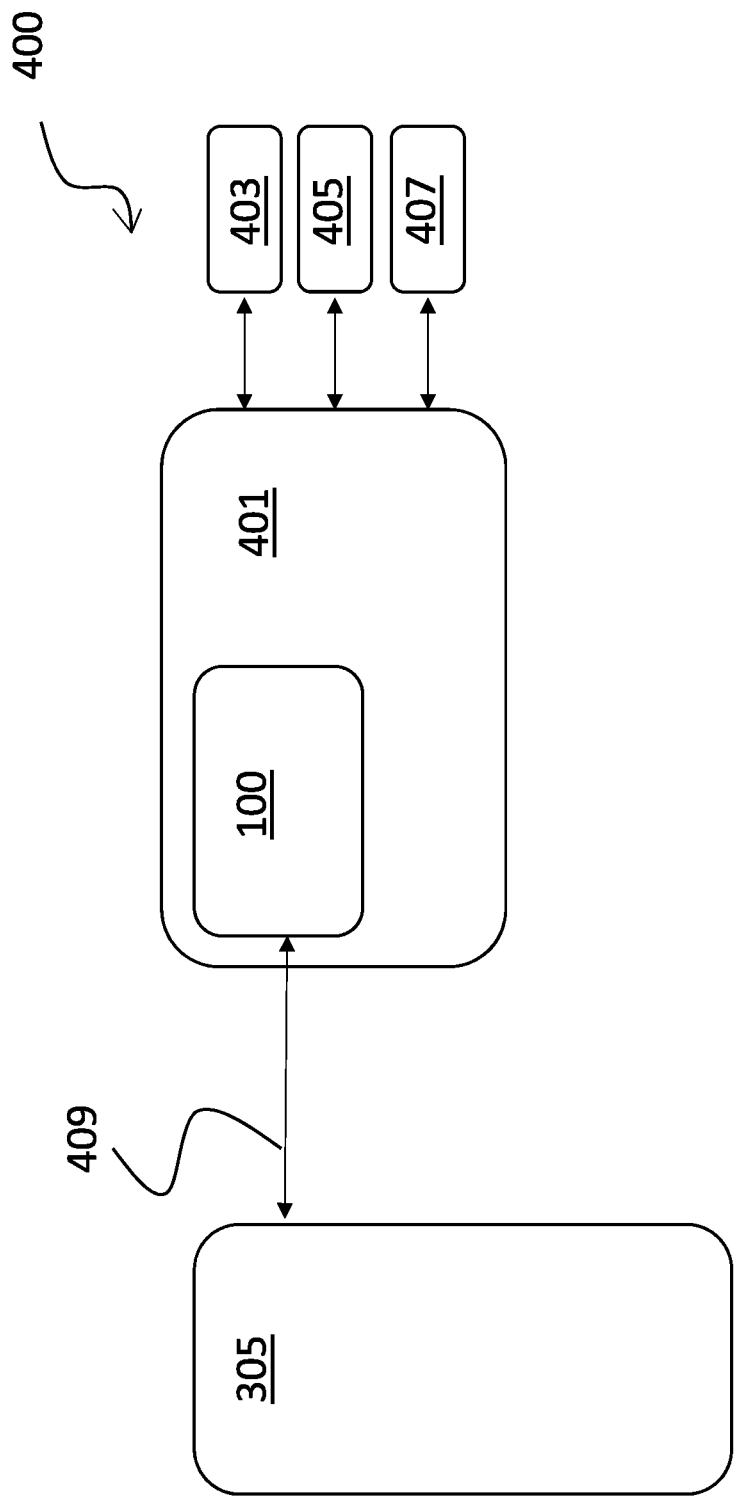
FIG. 4 shows a further possible embodiment of the presented communication system.

A communication system 400 is shown in FIG. 4. Communication system 400 comprises a signal-based device 401, in this case a node control device, connected to further signal-based devices 403, 405, and 407, and device 100 according to FIG. 1.

Device 100 is connected to a service-oriented communication partner 305, as indicated by arrow 409. Accordingly, device 100 acts as an intermediary between signal-based device 401 and, as a result, the further signal-based devices 403, 405, and 407, and the service-oriented communication partner 305. To this end, device 100 provides service-oriented communication partner with an offering catalog of supported services. The offering catalog is dynamically updated depending on an operational state or an addition to or disconnection of devices 403, 405, and 407 from device 401.

Device 100 can be integrated into signal-based device 401 as an integrated circuit, for example, or can be connected to signal-based device 401 as a separate module.

A method 500 is shown in FIG. 5. Method 500 comprises a first connecting step 501 for connecting a possible embodiment of the presented device, such as, for example, device 100 according to FIG. 1, to a number of signal-based devices, a second connecting step 503 for connecting the device to a number of service-oriented communication partners, and a controlling step 505 for controlling a communication of the number of service-oriented communication partners with the number of signal-based devices by means of the device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device to enable a service-oriented communication with a signal-based communication, the device comprising:
a plurality of service-oriented communication interfaces for communicative connection to a number of external service-oriented communication partners;
a plurality of signal-based communication interfaces for communication with a number of external signal-based devices; and
an embedded system configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces into signal-based communication signals according to a signal-based communication protocol,
wherein the embedded system is configured to communicatively connect each of the signal-based communication interfaces to a separate, respective one of the plurality of service-oriented communication interfaces according to the predefined routing logic,
wherein the service-oriented communication protocol comprises instructions on how and where to insert communication data to complete said transforming signal-based communication signals into service-oriented communication signals.

2. The device according to claim 1, wherein the embedded system is configured to provide an offering catalog comprising a list of services adapted to be provided by the device, and the embedded system is further configured to dynamically update the offering catalog depending on the respective external signal-based devices, communicating with the device, using a predefined offering mapping logic.

3. The device according to claim 1, wherein the embedded system is configured to provide a request catalog comprising a list of services required for a predefined function, and to dynamically update the request catalog in response to the respective function of the predefined function using a predefined request mapping logic, and to forward respective data from respective provided services to corresponding external signal-based devices in accordance with the request mapping logic.

4. The device according to claim 1, wherein the embedded system is configured to route respective signal-based communication signals, predefined by a direct connection catalog, from the number of signal-based communication interfaces directly to respective service-oriented communication interfaces, predefined according to the predefined routing logic.

5. The device according to claim 1, wherein the device comprises a memory, and wherein the embedded system is configured to temporarily store cyclically provided signal-based communication signals in the memory and to assign respective signal-based communication signals, temporarily stored in the memory, asynchronously in time to the service-oriented communication signals to be provided to the cyclically provided signal-based communication signals.

6. The device according to claim 1, wherein the device comprises a user interface for configuring the routing logic and/or the offering mapping logic and/or the request mapping logic.

7. The device according to claim 1, wherein the embedded system is configured to transmit a switching signal to a respective external signal-based device depending on a service-oriented communication signal requested by an external service-oriented communication partner so as to activate or deactivate the respective external signal-based device.

8. The device according to claim 7, wherein the device comprises a switching communication interface, and wherein the embedded system is configured to transmit the switching signal to the respective external signal-based device via the switching communication interface.

9. A communication system for a vehicle, the communication system comprising:
a number of signal-based devices;
a number of service-oriented communication partners; and
the device according to claim 1, the device being configured to communicatively connect the number of signal-based devices to the number of service-oriented communication partners.

10. A method to control a communication in a communication system, the method comprising:
connecting the device according to claim 1 to a number of signal-based devices;
connecting the device to a number of service-oriented communication partners; and
controlling a communication of the number of service-oriented communication partners with the number of signal-based devices via the device.

11. The device according to claim 1, wherein said service-oriented communication comprises exchanging packet data combined into services by means of the service-oriented protocol and assigning the packet data combined into services to a respective one of the external service-oriented communication partners.

12. The device according to claim 11, wherein the services are assigned dynamically by adjusting communication parameters.

13. The device according to claim 1, wherein said transforming signal-based communication signals into service-oriented communication signals according to the service-oriented communication protocol comprises a process in which signal-based communication signals are reorganized in such a way that the signals can be processed with a respective communication protocol.

14. The device according to claim 2, wherein the predefined offering mapping logic species which data can be offered as a respective service and by which of the external signal-based devices.

15. The device according to claim 4, wherein, by said direct connection, a direct access to corresponding signal-based devices is provided in which access to data, generated by the external signal-based devices, is provided without transformation of the data.

16. The device according to claim 1, wherein said predefined routing logic is configured to change dynamically depending on a particular external signal-based device.

17. The device according to claim 1, wherein the embedded system is configured to communicatively connect respective signal-based communication interfaces to respective service-oriented communication interfaces according to the predefined routing logic one-to-one.

18. The device according to claim 1, wherein the predefined routing logic is configured to be dynamically adapted.

19. The device according to claim 1, wherein the predefined routing logic is modifiable.

20. The device according to claim 1, further comprising a user interface configured to enable a user to customize the predefined routing logic.

21. A device to enable a service-oriented communication with a signal-based communication, the device comprising:
a plurality of service-oriented communication interfaces for communicative connection to a number of external service-oriented communication partners;
a plurality of signal-based communication interfaces for communication with a number of external signal-based devices; and
an embedded system configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces into signal-based communication signals according to a signal-based communication protocol, wherein the embedded system is configured to communicatively connect each of the signal-based communication interfaces to a separate, respective one of the plurality of service-oriented communication interfaces according to the predefined routing logic;
a user interface configured to enable a user to customize forwarding rules, the predefined logic, an offering mapping logic and/or a request mapping logic.

22. A device to enable a service-oriented communication with a signal-based communication, the device comprising:
a plurality of service-oriented communication interfaces for communicative connection to a number of external service-oriented communication partners;
a plurality of signal-based communication interfaces for communication with a number of external signal-based devices; and
an embedded system configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces into signal-based communication signals according to a signal-based communication protocol,
wherein the embedded system is configured to communicatively connect each of the signal-based communication interfaces to a separate, respective one of the plurality of service-oriented communication interfaces according to the predefined routing logic, wherein the predefined routing logic is configured to be dynamically adapted based on particular supported services.

23. A device to enable a service-oriented communication with a signal-based communication, the device comprising:
   a number of service-oriented communication interfaces for communicative connection to a number of external service-oriented communication partners;
   a number of signal-based communication interfaces for communication with a number of external signal-based devices; and
   an embedded system configured to communicatively connect respective signal-based communication interfaces to respective service-oriented communication interfaces according to a predefined routing logic, and to transform signal-based communication signals, provided by the respective signal-based communication interfaces, into service-oriented communication signals according to a service-oriented communication protocol, and to transform service-oriented communication signals, provided by the respective service-oriented communication interfaces into signal-based communication signals according to a signal-based communication protocol, wherein said transforming signal-based communication signals into service-oriented communication signals according to the service-oriented communication protocol comprises a process in which signal-based communication signals are reorganized in such a way that the signals can be processed with a respective communication protocol, and
   wherein the service-oriented communication protocol comprises instructions on how and where to insert communication data to complete said transforming signal-based communication signals into service-oriented communication signals.

* * * * *